US007536452B1

United States Patent
Cao et al.

(10) Patent No.: US 7,536,452 B1
(45) Date of Patent: May 19, 2009

(54) SYSTEM AND METHOD FOR IMPLEMENTING TRAFFIC MANAGEMENT BASED ON NETWORK RESOURCES

(75) Inventors: Jue Cao, Cary, NC (US); Philippe J. Marcais, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 1234 days.

(21) Appl. No.: 10/680,945

(22) Filed: Oct. 8, 2003

(51) Int. Cl.
*G06F 11/30* (2006.01)
*G06F 15/16* (2006.01)

(52) U.S. Cl. .................. 709/223; 709/224; 709/229; 726/23; 726/4; 726/14; 726/22; 713/200; 713/153

(58) Field of Classification Search ......... 709/203–204, 709/223–224, 229
See application file for complete search history.

(56) References Cited

U.S. PATENT DOCUMENTS

| | | | |
|---|---|---|---|
| 4,857,912 A | 8/1989 | Everett, Jr. et al. | 340/825.3 |
| 5,892,903 A | 4/1999 | Klaus | 395/187.01 |
| 6,253,337 B1 | 6/2001 | Maloney et al. | 714/38 |
| 6,256,773 B1 | 7/2001 | Bowman-Amuah | 717/1 |
| 6,304,262 B1 | 10/2001 | Maloney et al. | 345/418 |
| 6,370,573 B1 | 4/2002 | Bowman-Amuah | 709/223 |
| 6,519,703 B1 | 2/2003 | Joyce | 713/201 |
| 6,536,037 B1 | 3/2003 | Guheen et al. | 717/151 |
| 6,549,208 B2 | 4/2003 | Maloney et al. | 345/473 |
| 6,606,744 B1 | 8/2003 | Mikurak | 717/174 |
| 6,615,166 B1 | 9/2003 | Guheen et al. | 703/27 |
| 2002/0116644 A1* | 8/2002 | Richard | 713/201 |
| 2004/0015583 A1* | 1/2004 | Barrett et al. | 709/224 |

\* cited by examiner

*Primary Examiner*—Jude J Jean Gilles
(74) *Attorney, Agent, or Firm*—Baker Botts L.L.P.

(57) ABSTRACT

A method for implementing traffic management is provided that includes communicating a copy of one or more incoming packets and identifying a volume associated with the incoming packets in order to communicate feedback information to a main central processing unit (CPU), the feedback information signaling that an intrusion detection system (IDS) module is expending a designated amount of resources. The feedback information may be responded to by restricting a number of additional incoming packets that are received by the main CPU.

28 Claims, 1 Drawing Sheet

SYSTEM AND METHOD FOR IMPLEMENTING TRAFFIC MANAGEMENT BASED ON NETWORK RESOURCES

TECHNICAL FIELD OF THE INVENTION

This invention relates in general to the field of communications and, more particularly, to a system and method for implementing traffic management based on network resources.

BACKGROUND OF THE INVENTION

Networking architectures have grown increasingly complex in communication environments. In addition, the augmentation of clients or end users wishing to communicate in a network has caused many networking configurations and systems to become susceptible to elements that corrupt network traffic. The threat of external agents such as viruses, worms, Trojans and other damaging elements pose a serious risk to computer system architectures and end users alike. If not contained properly, these damaging elements can wreak havoc on network systems by disrupting communication flows, violating privacy, or compromising the integrity of information within the system.

More network resources are generally consumed as any given piece of network equipment attempts to address such security issues. For example, a large number of processing cycles may be needed in order to address a given packet flow of malicious traffic. In other scenarios, memory usage may be taxed in order to address a security concern. These procedures create a security loophole or an integrity issue because a given network element is susceptible to allowing destructive traffic to propagate freely when it is preoccupied or overwhelmed in dealing with other security concerns. During such times of vulnerability, a hacker may use a number of strategies or techniques in order to pierce network security, corrupt network communications, infiltrate network participants, or compromise routing of network traffic. Accordingly, the ability to provide for an effective security mechanism or protocol during periods of robust activity provides a significant challenge to system administrators and network operators.

SUMMARY OF THE INVENTION

From the foregoing, it may be appreciated by those skilled in the art that a need has arisen for an improved communications approach that provides for increased security in packet communications in a network environment. In accordance with one embodiment of the present invention, a system and method for implementing traffic management based on network resources are provided that greatly reduce disadvantages and problems associated with conventional security techniques.

According to one embodiment of the present invention, there is provided a method for implementing traffic management that includes communicating a copy of one or more incoming packets and identifying a volume associated with the incoming packets in order to communicate feedback information to a main central processing unit (CPU), the feedback information signaling that an intrusion detection system (IDS) module is expending a designated amount of resources. The feedback information may be responded to by restricting a number of additional incoming packets that are received by the main CPU.

Certain embodiments of the present invention may provide a number of technical advantages. For example, according to one embodiment of the present invention a communications approach is provided that allows for more secure communications between two points or network nodes. This is a result of the ability to provide dynamic feedback based on an overload being experienced in the IDS module. The overloading issue may be addressed by the IDS module, which may act automatically when its resources are low. The IDS module can act on different pieces of network equipment (e.g. routers) to control the amount of traffic forwarded for inspection. The policing rate could be dynamically adjusted, (increased or decreased) according to the intrusion detection system resources. Thus, a flow control mechanism between an intrusion detection module and a given network element is effectively established.

Controls may be added to allow proportionate throttling, whereby multiple thresholds could be configured for an intrusion detection system to police traffic proportionally. The additional controls allow proportionate throttling for the case of multiple input interfaces based on a statistical sub-sampling of the data to determine from which interfaces most of the data flow is coming. For example, if the intrusion detection system CPU load is due to a denial of service (DoS) type of attack, the interface throttling may be weighted most heavily toward the interface that is sourcing the most traffic. These operations effectively close a potential vulnerability in a security protocols. Further, such operations minimize potential breaches in security and improve network defense mechanisms that attempt to address the harmful effects of malicious traffic. Certain embodiments of the present invention may enjoy some, all, or none of these advantages. Other technical advantages may be readily apparent to one skilled in the art from the following figures, description, and claims.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which.

DETAILED DESCRIPTION OF EXAMPLE EMBODIMENTS OF THE INVENTION

Figure 1:
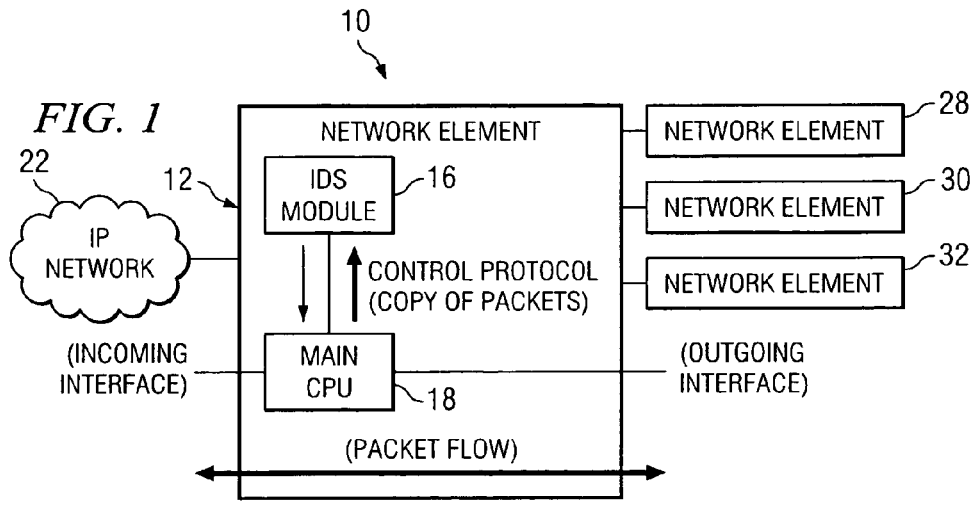
FIG. 1 is a simplified block diagram of an intrusion detection system for implementing traffic management based on network resources in accordance with one embodiment of the present invention.

FIG. 1 is a simplified block diagram of an intrusion detection system 10 for implementing traffic management based on the availability of network resources. Intrusion detection system 10 may include a network element 12 that includes an intrusion detection system (IDS) module 16 and a main central processing unit (CPU) 18. Note that the designation of 'main' for this element is arbitrary and relates only to its association with whichever network element is chosen to implement the teachings of the present invention. Intrusion detection system 10 may also include an Internet protocol (IP) network 22 that sends a plurality of packets to network element 12. Packets propagating from IP network 22 to network element 12 may be said to be coming from the 'network side' as discussed herein in this document. Intrusion detection system 10 may also include a number of additional network elements 28, 30, and 32.

FIG. 1 may be generally configured or arranged to represent any communication architecture capable of exchanging packets in a network environment. In addition, intrusion detection system 10 may include any suitable networking protocol or arrangement that provides a communicative platform for intrusion detection system 10. Such architectures may include, for example, first generation, 2G, 2.5G, and 3G architectures that provide packet-exchanging capabilities. Intrusion detection system 10 may include a configuration capable of transmission control protocol/Internet protocol (TCP/IP) communications for the transmission or reception of packets in a network.

In accordance with the teachings of the present invention, intrusion detection system 10 provides for a control protocol to be implemented such that IDS module 16 may communicate with main CPU 18 in cases where an overloading occurs. IDS module 16 inherently has a limited amount of processing power and memory such that in cases where it becomes overloaded it cannot properly address attacks in the network. A network attack can generally produce a high rate of traffic, which propagates into the network. During such times of robust communications, network element 12 (and any associated components therein (e.g. IDS module 16)) may become overloaded such that its resources are depleted. Any given network may be vulnerable during such states and susceptible to allowing destructive packets to pass through network equipment from the network.

This overloading issue may be addressed in a number of ways. For example, IDS module 16 may send an alarm to a management center when it is low on resources (e.g. its CPU reaches some threshold). The decision as to whether to act may then be determined by a network administrator. In another response, IDS module 16 may act automatically when its resources are low. IDS module 16 can act on different pieces of network equipment (e.g. routers) to effectively control the amount of traffic forwarded for inspection. IDS module 16 is able to login to some network elements (e.g. routers) and configure traffic policing to limit the traffic forwarded to the network segment with the intrusion detection system. This policing rate could be dynamically adjusted, (increased or decreased) according to the intrusion detection system resources. Thus, a flow control mechanism between the intrusion detection system and a given network element is effectively established.

Controls may be added to the feedback and signaling protocol, existing between IDS module 16 and main CPU 18, to allow proportionate throttling. For example, multiple thresholds could be configured in IDS module 16 to police traffic proportionally. Controls could also be added to allow proportionate throttling for the case of multiple input interfaces based on a statistical sub-sampling of the data to determine from which interfaces most of the data flow is coming. For example, if the CPU load of IDS module 16 is due to a denial of service (DoS) type of attack, the interface throttling may be weighted most heavily toward the interface that is sourcing the most traffic. Such a process effectively closes a potential vulnerability in a security protocol. This would resolve potential breaches in security and improve a network defense mechanism that attempts to minimize the harmful effects of malicious traffic.

Protocols that exist between IDS module 16 and main CPU 18 (e.g. protocols that ensure both elements are 'alive' and operational or protocols that monitor a CPU) may be leveraged in order to provide such a feedback/resource management protocol. There are a number of appropriate ways for intrusion detection system 10 to configure or to manage main CPU 18. For example, a small script may be executed on IDS module 16 to configure main CPU 18. The script may signal main CPU 18 and indicate the correct command-line interface (CLI) to modify the CPU configuration.

In alternative embodiments, a protocol running between IDS module 16 and main CPU 18 may be used to modify the configuration without telneting main CPU 18. (Note that telnet represents a user command and an underlying TCP/IP protocol for accessing remote computers.) An extension of any existing router blade control protocol (RBCP) could also be used for such a purpose. In yet another embodiment, a simple network management protocol (SNMP) protocol may be used to configure the CPU. SNMP represents a uniform public Internet engineering task force (IETF) standard (RFC 1157). In other embodiments, any suitable protocol that exists between main CPU 18 and IDS module 16 may be leveraged to achieve the identified feedback/resource management functionality.

Note that any given protocol may be expanded to include more feedback information (e.g. identifying memory usage, CPU utilization, etc). Main CPU 18 may respond in cases of overloading by blocking certain traffic propagating from IDS module 16 or by blocking certain traffic coming from the network side until the existing traffic conditions subside.

IDS module 16 is autonomous in that it is capable of signaling an alert to main CPU 18 indicating that IDS module 16 is overloaded in order to solicit a response from main CPU 18 that alleviates this problem. Such an operation does not need any input from a manager center or decisions to be made by a network operator. Accordingly, the control protocol offers a solution that is independent of human intervention. Additionally, such a solution is dynamic, providing a fast adaptation to the environment and to the traffic rate variation. Moreover, such a protocol could improve security by limiting the number of uninspected packets during times when IDS module 16 is being burdened.

In operation of an example flow of intrusion detection system 10, a packet may propagate from IP network 22 to network element 12. The packet may be received at main CPU 18. A copy of the packet may be made by main CPU 18 and communicated to IDS module 16. IDS module 16 may analyze each packet in order to detect if the packet signifies malicious traffic or if an attack is occurring. Such an attack may be based on a number of packets or simply a single packet. IDS module 16 may receive an additional flow of packets (e.g. during an attack) such that it becomes overloaded. IDS module 16 may be consuming a large number of resources (time-intensive CPU cycles, memory usage, etc.) and communicate a signal or message to main CPU 18 indicating this burden. The message may indicate that an abundance of traffic is being received by IDS module 16. IDS module 16 may also signal to main CPU 18 that it can only process so many packets in a given time interval. In a general sense, feedback is being provided by IDS module 16 to main CPU 18 in order to address the large volume of incoming packets that are taxing or overwhelming IDS module 16.

Main CPU 18 may respond by blocking traffic from the incoming side (network side) in order to alleviate the strains being placed on IDS module 16. This may include blocking traffic from designated addresses. Note that such a throttling control may be gradual, whereby systematic condition parameters are communicated from IDS module 16 to main CPU 18. This allows for a dynamically tunable model that offers the ability to proportionately control packet flows. Controls may be triggered based on a number of thresholds and not necessarily implemented in an ON/OFF (absolute) manner.

Note also that once IDS module 16 sees a packet or a group of packets that signify some malicious traffic, a number of appropriate responses can be performed. For example, an alarm may be signaled that indicates this condition to a management center. The alarm may include source and destination addresses or any other pertinent information associated with the harmful packet flow. In addition, a TCP reset may also be executed that indicates an attack is being seen from a given source address. Thus, a TCP reset may be performed for that source address (and source port number) in order to tear down the corresponding connection.

Additionally, in cases where a source address is consistently seen as attacking a given node in the network, an access control list (ACL) may be generated and used to block a given source location. An ACL is a table that tells a computer operating system which access rights each user has to a particular system object, such as a file directory or an individual file. Each object has a security attribute that identifies its access control list. The list may have an entry for each system user with access privileges.

Network element 12 is a network device that may exchange data or information via one or more packets. Network element 12 may include IDS module 16, which may be inclusive of its own CPU. Network element 12 may also include main CPU 18, which may include suitable incoming and outgoing interfaces as illustrated in FIG. 1. Main CPU 18 may execute packet-forwarding operations and, additionally, send a copy of incoming packets to IDS module 16 for inspection. In a particular embodiment of the present invention, network element 12 is a router and main CPU 18 is part of the router's internal structure. Alternatively, network element 12 may be a loadbalancer, a switch, a processor, a bridge, a gateway, or any other network device, element, component, or object capable of facilitating a data or an information exchange in a network environment.

Network element 12 may include any suitable routing tables, software, hardware, algorithms, or elements that may be used to effectuate their operations. These items may be provided within IDS module 16, main CPU 18, or positioned in any other suitable location. In a particular embodiment of the present invention, IDS module 16 and main CPU 18 each include software that allows for an appropriate interfacing such that feedback is provided to main CPU 18. The feedback information identifies a volume level associated with incoming packets being received by IDS module 16. The feedback information may also be inclusive of data associated with processing cycles, memory usage, processor utilization, or any other pertinent data that may be germane to the operations of main CPU 18 or IDS module 16.

Note that such feedback information may be provided systematically: for example as part of an arbitrary routine whereby data is provided at selected time intervals. In other scenarios, the feedback data may be triggered by certain threshold volume levels (associated with incoming packets) being reached by IDS module 16. In alternative embodiments, the software that enables these activities could be readily replaced with hardware, or any other suitable object, module, algorithm, application specific integrated circuit (ASIC), erasable programmable read only memory (EPROM), electrically erasable programmable ROM (EEPROM), or element operable to facilitate the operations of IDS module 16 and/or main CPU 18. Note that any suitable combinations of these elements may also be used where appropriate and based on particular communication needs.

Network element 12 may also represent an element owned by a corporation; for example, network element 12 may be an element owned by an Internet service provider (ISP). In alternative embodiments, network element 12 is not inclusive of IDS module 16, as it may be provided in any suitable location external thereto. Similarly, main CPU 18 may be provided external to network element 12 where appropriate: such configuration choices being based on selected communication architectures.

Any number of infective elements may be encountered by network element 12 and present a damaging object that could possibly cause problems in a network environment. For example, such an infective element may be a Trojan, a worm, a virus, or any other damaging element that operates to corrupt data, compromise the integrity of information, erase or modify data, or generally disrupt properly functioning elements within intrusion detection system 10. Other infective elements may correspond to non-compliant software or operations of an infected computer according to outdated protocols.

A Trojan is a program that performs some unexpected or some unauthorized (usually malicious) action such as displaying messages, erasing files, or corrupting the formatting of a disk, for example. Trojans may also transmit data to other destinations, and operate as proxies for some master agent. A Trojan generally can also infect other host files. A Trojan is typically inserted on one or more target machines and lays dormant until it is instructed to initiate some action, such as to propagate, to transmit, or (most commonly) to execute an improper DoS function.

DoS attacks are strategies employed in order to tie up mission-critical resources used to run websites or enterprise applications. In some cases, security gaps and glitches or other vulnerabilities in Unix or Windows operating systems are exploited to intentionally crash a corresponding system. In other cases, large amounts of ostensibly valid traffic are directed to single sites until the sites become overloaded and crash. Forms of DoS attacks include: Code Red, nimda, ping-pong, SYN flood, UDP flood, and Smurf attacks. Some DoS strategies intend to simply clog network peering points. DoS attacks may also be used where a hacker has gained access to some portion of a vulnerable networking system. Infiltrating software may be installed on the compromised machine so that it may be activated remotely in order to launch a corresponding attack. In order to launch the DoS attack, hackers generally only need a single port of access to a corresponding system. Hackers may use any number of devices in order to gain initial access such as: network scanners or sniffers, password cracking and guessing tools, session hijacking, and IP spoofing.

A worm is a self-contained program or a set of programs that is able to spread functional copies of itself or its segments to other computers. This propagation of copies may occur via network connections or email attachments. Worms may self-propagate, and piggyback on virtually any network service, such as hypertext transfer protocol (HTTP) formats.

A virus is a malicious program that may be introduced into network architecture in an email attachment, a file load, a program, or in any other suitable entry form. Viruses may be classified into various types depending on file formats and infection routines. Such examples of viruses include: macro viruses, boot sector viruses, script viruses, file infecting viruses, ActiveX malicious code viruses, and destructive viruses.

An example of a virus implementation that seeks to penetrate intrusion detection system 10 is a Zip file with a Word document attached to the file. An end user may open the Zip file in order to view the document; the associated machine of the end user may indirectly or directly save the Word document. With the document in the system, the virus performs its designated functions. The virus capitalizes on buffer overflow (and generally has the requisite knowledge to do so) in the Word program such that it gains access through the overflow and begins to impair the system in whatever way it was programmed to do e.g., delete files, corrupt data, change or modify information, etc. Viruses may be detected via a suitable notification, such as those disclosed through a window that is automatically generated by a virus detection protocol. Security protocols, such as anti-virus software, may generate this type of window. The window may explain, for example, that John X is trying to communicate with your machine and further ask for the end user's permission to do so.

IP network 22 represents a series of points or nodes of interconnected communication paths for receiving and transmitting packets of information that propagate through intrusion detection system 10. IP network 22 offers a communicative interface between an end user and any other network location (e.g. network element 12). IP network 22 may be replaced with an Intranet or any other suitable element that facilitates a data exchange in a network environment or that is implicated by communications involving an end user. IP network 22 may alternatively be any local area network (LAN), wireless local area network (WLAN), metropolitan area network (MAN), wide area network (WAN), virtual private network (VPN), or any other appropriate architecture or system that facilitates communications in a network environment. These elements may implement a user datagram protocol (UDP)/Internet protocol (UDP/IP) communication language protocol in a particular embodiment of the present invention. However, these elements may alternatively implement any other suitable communication protocol for transmitting and receiving data or information within intrusion detection system 10.

Figure 2:
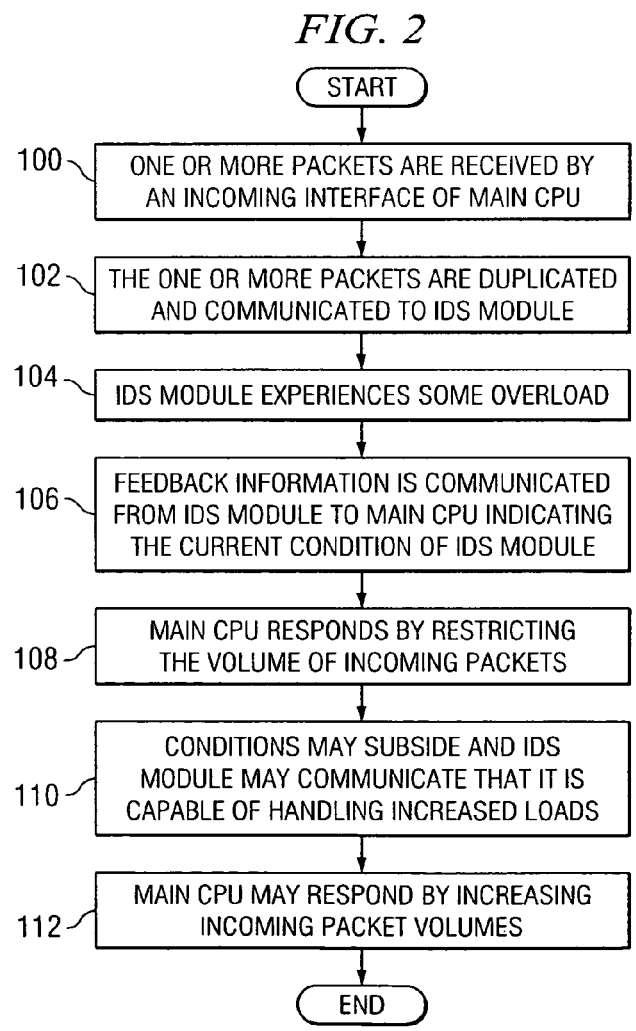
FIG. 2 is a flow chart illustrating a series of example steps associated with a method for implementing traffic management based on network resources.

FIG. 2 is a simplified flow chart illustrating a series of example steps associated with a method for implementing management traffic based on network resources. The method may begin at step 100 where one or more packets are received by an incoming interface of main CPU 18. The one or more packets are duplicated and communicated to IDS module 16 at step 102. At step 104, IDS module 16 may experience some overload. The overload may be associated with an attack that is occurring in the network, as it is common for such attacks to spawn an increase in network traffic.

At step 106, feedback information may be communicated from IDS module 16 to main CPU 18 indicating the current condition of IDS module 16. Other data may also be included within such feedback information, such as memory usage, processing utilization, or current time intervals associated with processing cycles. At step 108, main CPU 18 may respond by restricting the volume of incoming packets. Conditions may subside and IDS module 16 may communicate that it is capable of handling increased loads at step 110. Main CPU 18 may respond by increasing incoming packet volumes to acceptable levels at step 112. This process may continue indefinitely as the volume of incoming packets is systematically regulated.

Some of the steps illustrated in FIG. 2 may be changed or deleted where appropriate and additional steps may also be added to the flowchart. These changes may be based on specific communication architectures or particular interfacing arrangements and configurations of associated elements and do not depart from the scope or the teachings of the present invention.

Although the present invention has been described in detail with reference to particular arrangements and configurations, these example configurations and arrangements may be changed significantly without departing from the scope of the present invention. For example, although the present invention has been described with reference to particular communication exchanges, intrusion detection system 10 is applicable to any routing protocol or routed protocol.

In addition, although intrusion detection system 10 has been illustrated with reference to particular elements that facilitate the communication process, these elements may be replaced by any suitable architecture or configuration that achieves the intended functionality of intrusion detection system 10. Certain elements may be used to identify threshold volume levels, whereby other elements are relegated the task of reducing information flows until network conditions have subsided. Additionally, tasks or operations may be provided and locations other than those illustrated in FIG. 1. The present invention anticipates considerable flexibility in the placement and positioning of the elements included within the internal structure of network element 12.

Numerous other changes, substitutions, variations, alterations, and modifications may be ascertained to one skilled in the art and it is intended that the present invention encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this invention in any way that is not otherwise reflected in the appended claims.

What is claimed is:

1. An apparatus, comprising:
an intrusion detection system (IDS) module coupled to a main central processing unit (CPU), the main CPU being operable to communicate a copy of one or more incoming packets to the IDS module, the IDS module having an IDS CPU, the IDS module operable to:
determine that the IDS CPU has reached a particular threshold indicating that the IDS module is low on a resource;
identify a volume associated with the incoming packets in response to the determination; and
communicate feedback information to the main CPU, the feedback information signaling that the IDS module is low on the resource, the main CPU operable to respond to the feedback information by restricting a number of additional incoming packets that are received by the main CPU.

2. The apparatus of claim 1, wherein the IDS module is operable to identify a plurality of thresholds, one or more of which are operable to trigger the feedback information to be communicated to the main CPU by the IDS module, the one or more thresholds each representing volume levels reflecting an amount of incoming packets that are received by the IDS module, and wherein the main CPU is operable to increase the volume associated with the incoming packets in response to receiving additional feedback from the IDS module.

3. The apparatus of claim 1, wherein the IDS module communicates with the main CPU based on a selected one of a router blade control protocol (RBCP) and a simple network management protocol (SNMP).

4. The apparatus of claim 1, wherein the IDS module is operable to communicate an alarm to a network management element that signals that the IDS module has reached a certain volume level associated with an amount of incoming packets received.

5. The apparatus of claim 1, wherein the IDS module is operable to execute a transmission control protocol (TCP) reset in order to indicate an attack is being seen from a source address such that a connection corresponding to the source address may be torn down.

6. The apparatus of claim 1, wherein the IDS module is operable to block a source location by establishing an access control list (ACL) that includes the source location, wherein communications associated with the source location are restricted as a result of being included on the ACL.

7. The apparatus of claim 1, wherein the IDS module and the main CPU are included in a network element, the network element being selected from a group of elements consisting of:
   (a) a router;
   (b) a bridge;
   (c) a switch;
   (d) a loadbalancer;
   (e) a processor; and
   (f) a gateway.

8. A method for implementing traffic management, comprising:
   receiving, at an intrusion detection system (IDS) module, a copy of one or more incoming packets from a main central processing unit (CPU), the IDS module having an IDS CPU;
   determining that the IDS CPU has reached a particular threshold indicating that the IDS module is low on a resource;
   identifying a volume associated with the incoming packets in response to the determination;
   communicating feedback information to the main CPU, the feedback information signaling that the IDS module is low on the resource; and
   responding to the feedback information by restricting a number of additional incoming packets that are received by the main CPU.

9. The method of claim 8, further comprising:
   identifying a plurality of thresholds, one or more of which are operable to trigger the feedback information to be communicated to the main CPU by the IDS module, the one or more thresholds each representing volume levels of incoming packets that are received by the IDS module.

10. The method of claim 8, wherein the IDS module communicates with the main CPU based on a selected one of a router blade control protocol (RBCP) and a simple network management protocol (SNMP).

11. The method of claim 8, further comprising:
    communicating an alarm to a network management element that signals that the IDS module has reached a certain volume level associated with an amount of incoming packets received.

12. The method of claim 8, further comprising:
    executing a transmission control protocol (TCP) reset in order to indicate an attack is being seen from a source address such that a connection corresponding to the source address may be torn down.

13. The method of claim 8, further comprising:
    blocking a source location by establishing an access control list (ACL) that includes the source location, wherein communications associated with the source location are restricted as a result of being included on the ACL.

14. The method of claim 8, further comprising:
    increasing the volume associated with the incoming packets based on additional feedback being received from the IDS module, the additional feedback reflecting a reduced volume associated with the incoming packets.

15. A computer hardware system for implementing traffic management, comprising:
    means for receiving, at an intrusion detection system (IDS) module, a copy of one or more incoming packets from a main central processing unit (CPU), the IDS module having an IDS CPU;
    means for determining that the IDS CPU has reached a particular threshold indicating that the IDS module is low on a resource;
    means for identifying a volume associated with the incoming packets in response to the determination;
    means for communicating feedback information to the main CPU, the feedback information signaling that the IDS module is low on the resource; and
    means for responding to the feedback information by restricting a number of additional incoming packets that are received by the main CPU.

16. The computer hardware system of claim 15, further comprising:
    means for identifying a plurality of thresholds, one or more of which are operable to trigger the feedback information to be communicated to the main CPU by the IDS module, the one or more thresholds each representing volume levels of incoming packets that are received by the IDS module.

17. The computer hardware system of claim 15, wherein the IDS module communicates with the main CPU based on a selected one of a router blade control protocol (RBCP) and a simple network management protocol (SNMP).

18. The computer hardware system of claim 15, further comprising:
    means for communicating an alarm to a network management element that signals that the IDS module has reached a certain volume level associated with an amount of incoming packets received.

19. The computer hardware system of claim 15, further comprising:
    means for executing a transmission control protocol (TCP) reset in order to indicate an attack is being seen from a source address such that a connection corresponding to the source address may be torn down.

20. The computer hardware system of claim 15, further comprising:
    means for blocking a source location by establishing an access control list (ACL) that includes the source location, wherein communications associated with the source location are restricted as a result of being included on the ACL.

21. The computer hardware system of claim 15, further comprising:
    means for increasing the volume associated with the incoming packets based on additional feedback being received from the IDS module, the additional feedback reflecting a reduced volume associated with the incoming packets.

22. A computer-readable storage medium having instructions stored thereon, the instructions when executed by one or more central processing units (CPUs) are operable to:
    receive, at an intrusion detection system (IDS) module, a copy of one or more incoming packets from a main central processing unit (CPU), the IDS module having an IDS CPU;

determine that the IDS CPU has reached a particular threshold indicating that the IDS module is low on a resource;

identify a volume associated with the incoming packets in response to the determination;

communicate feedback information to the main CPU, the feedback information signaling that the IDS module is low on the resource; and respond to the feedback information by restricting a number of additional incoming packets that are received by the main CPU.

23. The medium of claim 22, the instructions further operable to:

identify a plurality of thresholds, one or more of which are operable to trigger the feedback information to be communicated to the main CPU by the IDS module, the one or more thresholds each representing volume levels of incoming packets that are received by the IDS module.

24. The medium of claim 22, wherein the IDS module communicates with the main CPU based on a selected one of a router blade control protocol (RBCP) and a simple network management protocol (SNMP).

25. The medium of claim 22, the instructions further operable to:

communicate an alarm to a network management element that signals that the IDS module has reached a certain volume level associated with an amount of incoming packets received.

26. The medium of claim 22, the instructions further operable to:

execute a transmission control protocol (TCP) reset in order to indicate an attack is being seen from a source address such that a connection corresponding to the source address may be torn down.

27. The medium of claim 22, the instructions further operable to:

block a source location by establishing an access control list (ACL) that includes the source location, wherein communications associated with the source location are restricted as a result of being included on the ACL.

28. The medium of claim 22, the instructions further operable to:

increase the volume associated with the incoming packets based on additional feedback being received from the IDS module, the additional feedback reflecting a reduced volume associated with the incoming packets.

* * * * *